United States Patent
Baumgart et al.

[11] Patent Number: 6,107,599
[45] Date of Patent: *Aug. 22, 2000

[54] METHOD AND TOOL FOR LASER TEXTURING OF GLASS SUBSTRATES

[75] Inventors: Peter Baumgart; Chie Ching Poon, both of San Jose; Andrew Ching Tam, Saratoga, all of Calif.

[73] Assignee: International Business Machines Corporation, Armonk, N.Y.

[*] Notice: This patent is subject to a terminal disclaimer.

[21] Appl. No.: 09/290,648

[22] Filed: Apr. 12, 1999

Related U.S. Application Data

[63] Continuation of application No. 08/795,627, Feb. 6, 1997, Pat. No. 5,910,262.

[51] Int. Cl.$^7$ .............................. B23K 26/00; G02F 1/33
[52] U.S. Cl. .............................. 219/121.77; 219/121.68; 219/121.69
[58] Field of Search ............... 219/121.76, 121.77, 219/121.68, 121.69, 121.73, 121.83; 264/400; 427/554, 555, 556; 360/135; 359/285

[56] References Cited

U.S. PATENT DOCUMENTS

| | | | |
|---|---|---|---|
| 3,989,778 | 11/1976 | Osborne | 264/25 |
| 4,224,096 | 9/1980 | Osborne | 156/380 |
| 5,062,021 | 10/1991 | Ranjan et al. | 360/135 |
| 5,105,304 | 4/1992 | Tanaka et al. | 359/285 |
| 5,108,781 | 4/1992 | Ranjan et al. | 427/53.1 |
| 5,246,531 | 9/1993 | Junji et al. | 156/143 |
| 5,482,497 | 1/1996 | Gonnella et al. | 451/57 |
| 5,508,119 | 4/1996 | Sheu et al. | 428/687 |
| 5,567,484 | 10/1996 | Baumgart et al. | 427/555 |
| 5,595,791 | 1/1997 | Baumgart et al. | 427/554 |
| 5,658,475 | 8/1997 | Barenboim et al. | 219/121.77 |
| 5,783,793 | 7/1998 | Emerton et al. | 219/121.71 |
| 5,822,211 | 10/1998 | Barenboim et al. | 364/474.08 |
| 5,910,262 | 6/1999 | Baumgart et al. | 219/121.77 |
| 5,981,903 | 11/1999 | Baumgart et al. | 219/121.77 |

FOREIGN PATENT DOCUMENTS

| | | |
|---|---|---|
| 7-065359 | 3/1995 | Japan . |
| 8-224676 | 9/1996 | Japan . |
| 8-227521 | 9/1996 | Japan . |

OTHER PUBLICATIONS

Texturing A Magnetic Tape Surface—27470, Research Disclosure No. 274, Feb. 1987.

*Primary Examiner*—Geoffrey S. Evans
*Attorney, Agent, or Firm*—G. Marlin Knight

[57] ABSTRACT

Method and apparatus for laser texturing symmetrically and simultaneously both sides of a glass containing substrate, such as a magnetic disk. There are two or more acousto-optic modulators arranged in series to obtain equal laser pulses from a first beam from a laser, apparatus for capturing a first order diffracted beam from each acousto-optic modulator; monitoring the wavelength of the laser source, providing a visible indicator or diagnostic beam for each first order diffracted beam, and combining each first order diffracted beam with its respective indicator beam to form a texturing beam for texturing each side of the substrate.

17 Claims, 2 Drawing Sheets

METHOD AND TOOL FOR LASER TEXTURING OF GLASS SUBSTRATES

This application is a continuation of Ser. No. 8/795,627, filed Feb. 6, 1997, issued as U.S. Pat. No. 5,910,262.

FIELD OF THE INVENTION

The present invention relates to the field of texturing of glass or glass-containing substrates. More particularly, the invention pertains to the use of lasers to create textures on glass or glass-containing surfaces such as a glass or glass-containing magnetic disk used in a disk drive.

BACKGROUND OF THE INVENTION

A disk drive or direct access storage device ("DASD") includes several disks which look similar to records used on a record player or compact disks which are used in a CD player. The disks are stacked on a spindle, much like several 45 rpm records awaiting to be played. In a disk drive, however, the disks are mounted to the spindle and spaced apart so that the separate disks do not touch each other.

The surface of each disk is uniform in appearance. However, in actuality, the surface of each disk is divided into portions where data is stored. There are a number of tracks of the disk situated in concentric circles like rings on a tree. Compact disks have tracks as do the disks in a disk drive. The tracks in either the disk drive or the compact disk essentially replace the grooves on a conventional record. Each track in a disk drive is further subdivided into a number of sectors, where each sector is essentially just one section of the circumferential track.

Disks in a disk drive are made of a variety of materials. High capacity magnetic disks use a thin film magnetic media plated or vacuum deposited upon a substrate. Protective and lubricating layers may be applied over the magnetic active layer. Most commonly, the substrate of the disk is made of metal, plastic, or glass material. The material from which the disk is made determines how data is stored on the disk. A plastic disk, such as those used as CDS, stores data using lasers and a laser is used to read the data back. Storage of data on a metal disk entails magnetizing portions of the disk in a pattern which reflects the data.

To store data on a magnetic disk with a glass or metal substrate, the disk is magnetized. In order to magnetize the surface of a disk, a small ceramic slider which contains a magnetic transducer known as a write head is passed over the surface of the disk. More specifically, the write head is flown at a height of less than six millionths of an inch from the surface of the disk and is flown over the track as the write head is energized to various states causing the track below to be magnetized to represent the data to be stored.

To retrieve data stored on a magnetic disk, a ceramic slider which contains a read head is flown over the metal disk. The magnetized portions of the disk induce a current in the read head. By looking at output from the read head, the data can be reconstructed for use by the computer system. Typically, the same ceramic slider contains both a read head and a write head.

A smooth, specular recording surface is thus preferred, as well as a smooth opposing surface of the associated transducing head. This permits closer proximity of the head to the disk, and more predictable and consistent behavior of the air bearing supporting the head. However, if the head surface and recording surface are too flat, the precision match of these surfaces give rise to excessive stiction and friction during the start up and stopping of the disk, causing wear to the head and recording surface which eventually can lead to a head crash. In recognition of this difficulty, the recording surfaces of magnetic disks often are intentionally roughened, known as textured, to reduce the head/disk friction.

The topography of the surface of the disk has important effects on performance. Texturing or polishing the surface with a generally circumferential pattern improves the magnetic performance and increases the potential data density by improving the squareness and orientation ratio of the magnetic active layer. Providing texture in the landing zone has the three benefits of reducing stiction and friction, enhancing lubrication and reducing wear. Increasing the surface roughness reduces the problems that arise from adhesion of the head to the static disk surface.

Several methods exist in the art for texturing a disk. U.S. Pat. No. 5,482,497 to Gonnella, et al., discloses using an abrasive slurry to texture disks. Other examples of texturing methods are discussed in Gonnella at col. 2, lines 29–40.

The present invention pertains to the use of lasers to texture magnetic disks. More generally, the invention pertains to the use of lasers to texture glass or glass-containing substrates, such as a glass disk.

SUMMARY OF THE INVENTION

It is an object of the invention to provide a means for texturing glass or glass-containing substrates.

It is a further object of the invention to provide a means for texturing glass or glass-containing substrates that is fast and suitable for the mass production environment.

A further object of the invention is to provide a method for using a laser to texture glass or glass-containing substrates, particularly substrates used as magnetic disks, symmetrically and simultaneously on both sides of the substrate.

The invention is a method and apparatus for texturing glass or glass-containing substrates, such as substrates used in magnetic disks. The invention utilizes a laser to texture symmetrically and simultaneously both sides of the substrate. It is an advantage of the invention that the texturing method is fast and low cost, making it ideal for the manufacturing environment. A further advantage of the invention is that the texturing is done symmetrically and simultaneously on both sides of the substrate, such as a magnetic disk.

DETAILED DESCRIPTION OF THE INVENTION

Figure 1:
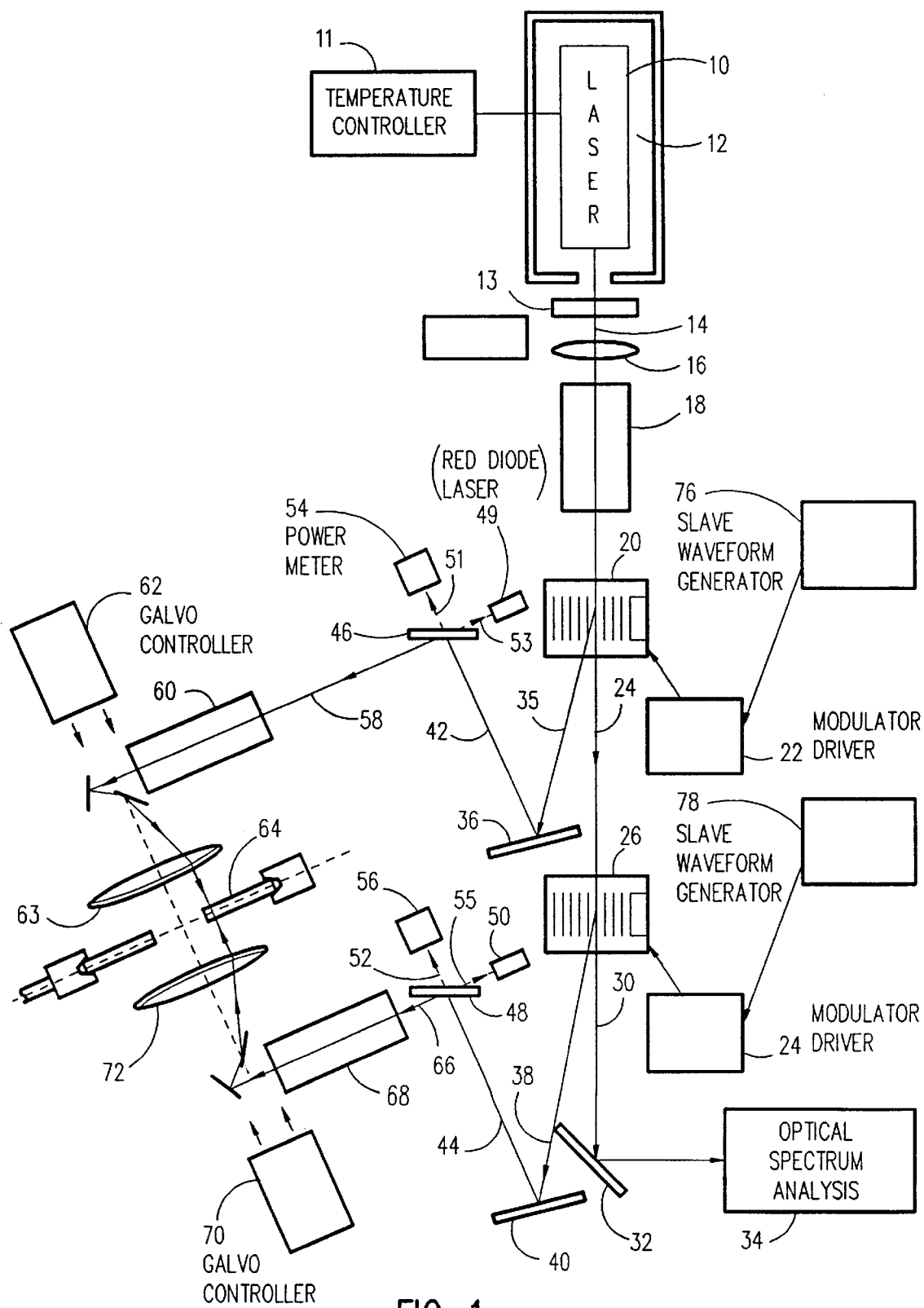
FIG. 1 is a schematic of one embodiment of a laser texturing tool for symmetrically and simultaneously texturing both sides of a glass or glass-containing substrate in accordance with the present invention.

We disclose a method for fast, symmetrical, and simultaneous texturing of both sides of a glass or glass-containing substrate, such as a magnetic disk substrate. We demonstrate the method with reference to texturing of a magnetic disk, as an example. The method uses a laser. Short pulses from the laser beam are serially sliced out, for example, by collecting the first order diffraction from two acousto-optic modulators in series. The beam path length for each beam is identical and the active optics are the same in order to produce equal texturing on both sides of the substrate, such as both sides of a magnetic disk.

The invention uses two acousto-optic modulators, referred to as Mod-A and Mod-B, arranged in a series, to slice out "equal" laser pulses from a "mother" laser beam. A master square-wave oscillator of 50—50 duty cycle is generated to make this possible. A 20 kHz rep rate is suitable for the oscillator. Mod-A and Mod-B are triggered by two independent pulse trains, each triggered by the rising and falling edges of the oscillator, respectively. All pulse widths are less than half of the master oscillator's period. Assuming a 20 kHz rep rate for the oscillator, this means that the pulse width for texturing the glass substrate typically is less than ten microseconds.

A first order diffracted beam is collected from each of Mod-A and Mod-B. There is some beam divergence in the two laser beams, so it is necessary to make the beams equal in propagation distance before each beam enters a beam expander. If the propagation distance is not equal, it is difficult to achieve the same beam profile in each beam, which is necessary to produce symmetrical, simultaneous texturing on each side of the target substrate.

Once the beams are made equal in propagation distance, each beam enters a beam expander. To texture each side of the substrate, two alternative techniques are possible. One technique involves moving the two laser beams across the substrate. This technique uses a Galvo mirror pair and an imaging lens with sufficient clear aperture to "telecentrically" scan each of the two focused laser spots on their respective sides of the stationary substrate to form the matrix of bumps (shown in FIG. 3) known as texturing. One bump is generated per laser pulse. The simultaneous nature of the two pulse trains and the equalization of the propagation distance results in texturing of both sides of the substrate.

An alternative technique to texturing each side of the substrate simultaneously, is to use rotation/translation stages to move the disk, while leaving the two laser beams focused to fixed locations.

The first option of using a stationary substrate and moving the laser beams provides the following advantage. Well-defined patterns can be written onto the substrate. The two Galvo scanners are independently controlled, so the texturing patterns can differ on the two sides of the substrate. That is, although the texturing is performed simultaneously on both sides of the substrate, the texture patterns do not have to be identical. Serialization and side-dependent identification is possible. Moreover, the first option generally permits faster throughput of the textured substrates and can be implemented at lower cost. A disadvantage of the first option is the need for a good, large-aperture focusing lens system.

FIG. 1 is a schematic showing one particular embodiment of the laser texturing tool of the present invention. This embodiment of the invention uses a temperature-stabilized carbon dioxide laser 10. Temperature stabilization is provided by temperature controller 11. The laser 10 has a range of 1–12 Watts, and operates in this embodiment at approximately ten watts. The laser 10 may be enclosed in a temperature controlling enclosure 12. The laser 10 produces a parent beam 14 at typical 9.25 micrometers wavelength.

Figure 2:
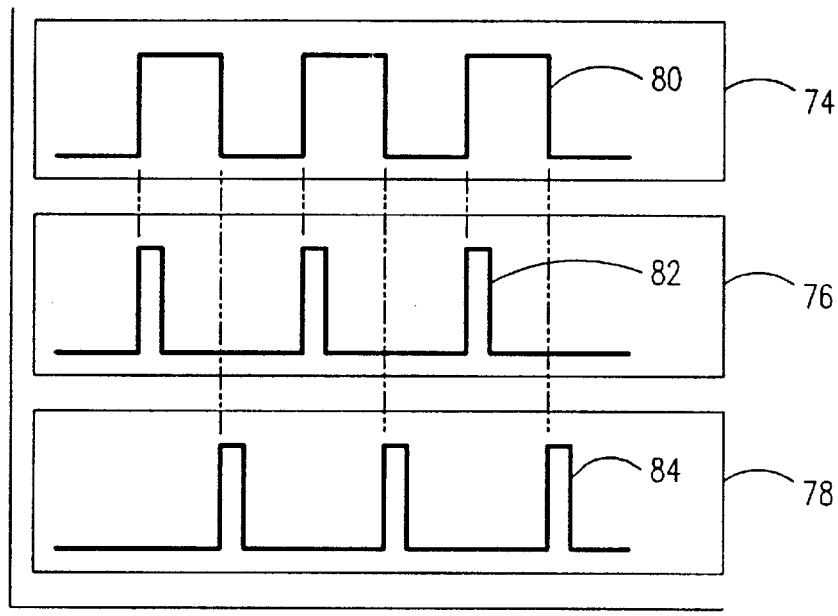
FIG. 2 is a detailed drawing of the pulse widths in one embodiment of the present invention.

The parent beam 14 as it leaves the laser 10 passes through a shutter 13, then through a collimating lens 16. The parent beam 14 then passes through a variable attenuator 18. Parent beam 14 then passes through a first acousto-optic modulator 20 (Mod-A) which has attached first modulator driver 22. As shown in FIG. 2, modulator 20 is triggered by a pulse train 82 produced by slave waveform generator 76 which in turn is triggered by the rising edge of the square wave 80 provided by the master waveform generator 74. Both the voltage and the width of the pulse train 82 are used to control the intensity and pulse length of the first order laser beam 35 produced by modulator 20.

The $0^{th}$ order beam 24 that leaves modulator 20 enters a second acousto-optic modulator 26 (Mod-B) with attached second modulator driver 28. As shown in FIG. 2, modulator 26 is triggered by a pulse train 84 produced by the second slave waveform generator 78 which in turn is triggered by the falling edge of the square wave 80 produced by master waveform generator 74. All pulse widths from modulator 20 and modulator 26 are less than half of the pulse width of the square wave 80. For example, if the square wave 80 is at a twenty kHz rep rate with a pulse width of 25 micro seconds, a pulse width of ten microseconds or less is produced by the two slave waveform generators 76 and 78 for modulator 20 and modulator 26. As for Mod-A 20, both the voltage and the width of the pulse train 84 are used to control the intensity and pulse length of the laser beam 35 produced by modulator 26. FIG. 2, described below, provides detail of the pulse widths.

The $0^{th}$ order beam 30 that leaves modulator 26 is directed to protected gold mirror 32, from which the beam reflects and is available for optical spectrum analysis to monitor the wavelength of the carbon dioxide laser beam, as indicated generically by box 34 of FIG. 1.

A first order diffracted beam 35 is captured from modulator 20. Diffracted beam 35 is reflected off of protected gold mirror 36. Correspondingly, first order diffracted beam 38 is captured from modulator 26 and is reflected off of protected gold mirror 40. Specifically, the intensity and laser beam pulse width of the diffracted beams 35 and 38 are controlled by the pulse height and pulse width of the electrical pulse trains 82 and 84 produced by the two slave waveform generators 76 and 78. Beams 42 and 44, leaving mirrors 36 and 40, respectively, must be made equal in propagation distance. This is necessary due to unavoidable beam divergence in the laser beams. If the propagation distance is not made equal, it would be difficult to get the same beam profile in each of the two beams used to produce the texturing of the glass substrate 64.

To make the propagation distance equal, beams 42 and 44 are reflected off of mirrors 46 and 48, respectively. Mirrors 46 and 48 are made of zinc selenide. For a 9.25 micrometer wavelength beam, mirrors 46 and 48 are approximately 90% reflective. Mirrors 46 and 48 are positioned at a 45° angle to beams 42 and 44, respectively. Two 675 nanometer wavelength diode lasers 49 and 50 are positioned behind each of mirrors 46 and 48. The red diode lasers 49 and 50 provide an indicator beam. The carbon dioxide laser 10 produces an invisible beam, so a collinearized visible beam is useful for alignment and diagnostics. Mirrors 46 and 48 are dielectrically coated to combine the red diode laser beams 53 and 55 from red diode lasers 49 and 50 with beams 42 and 44 to produce beams 58 and 66. Two power meters 54 and 56 receive beams 51 and 52, respectively, which are the transmitted portions of beams 42 and 44, through mirrors 46 and 48, respectively.

The reflected beam of beam 42 at mirror 46 combines with the beam 53 from red diode laser 49 to form beam 58.

Beam 58 enters beam expander 60. Beam expander 60 produces an expanded and collimated beam. The expansion is required to reduce the diameter of the ultimately focused beam used to do the texturing of the glass substrate 64. The Galvo controller 62 controls the Galvo mirror pair which steers the beam 58 as it leaves the beam expander 60. The beam 58 then passes through a zinc selenide lens 63. The lens 63 has a 50 mm clear aperture, with 50 mm focal length. Lens 63 serves to focus the beam 58. Beam 58, upon leaving the lens 63, is focused on a target substrate 64 and textures the surface of substrate 64. Target substrate 64 is made of glass or glass-containing substance. In the described implementation of the invention, the target substrate 64 is a magnetic disk substrate.

Simultaneously, the other side of target substrate 64 is textured by beam 66. Beam 66 is a beam that has passed through beam expander 68 and, subject to a second Galvo mirror pair and controller 70, has been focused by zinc selenide lens 72 onto the target substrate 64.

The laser texturing tool of FIG. 1 is one embodiment of the invention. Other embodiments of the invention are possible without departing from the spirit and scope of the invention. FIG. 1 implements a texturizing method that relies on moving the beams 58 and 66 across the surface of the substrate 64. Substrate 64 itself remains stationary. An alternative embodiment of the invention would be to move the substrate 64 and hold the beams 58 and 66 stationary.

Turning now to FIG. 2, FIG. 2 shows detail of the pulse widths mentioned in FIG. 1. FIG. 2 shows the waveform 80 produced by the master waveform generator 74. The waveform 80 is a square wave with pulse widths of twenty-five microseconds. Variable attenuator 18 alternates the intensity of beam 14. Waveforms 82 and 84 are generated by two slave waveform generators 76 and 78, each triggered by the rising and falling edge of waveform 80, respectively. The pulse widths of waves 82 and 84 are typically ten microseconds or less.

Figure 3:
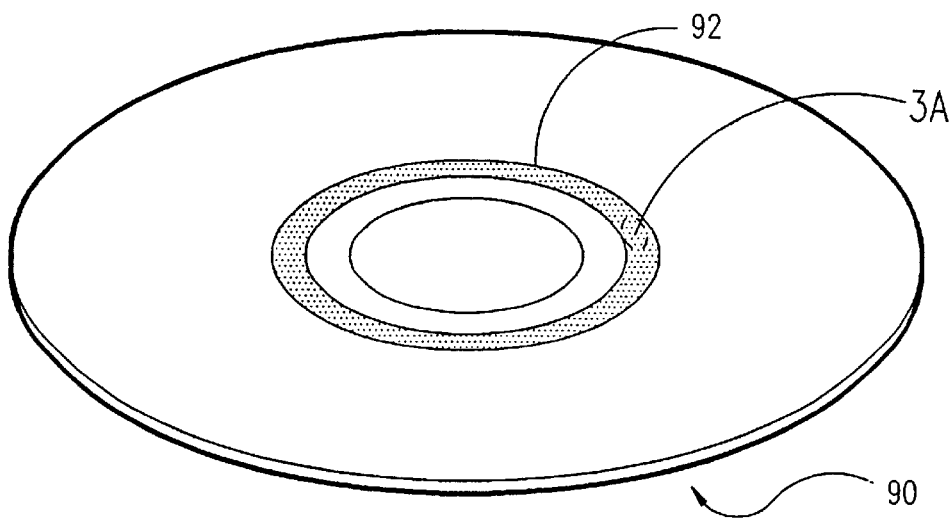
FIG. 3 is a drawing of a disk with an expanded view of the bumps created in the texturing process.
Figure 3A:
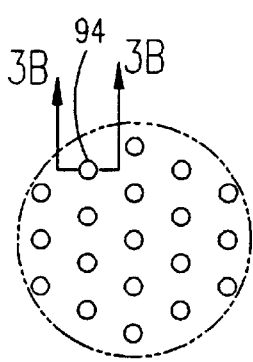
FIG. 3A shows an expanded plan view of a plurality of bumps in a textured portion of the disk shown in FIG. 3.
Figure 3B:
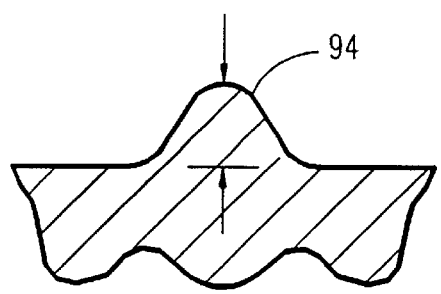
FIG. 3B is a cross-section of a single bump in the textured portion of the disk.

FIG. 3 shows a textured disk 90. FIG. 3 shows the disk 90. FIG. 3A is an expanded view of the textured portion 92 of the disk 90. The texturing process creates a matrix of rounded bumps which, in the disk 90 shown, will act as a dedicated landing zone for a slider or head/suspension assembly in a disk drive (not shown) that transmits information to and from the disk 90. FIG. 3B is an expanded view of a cross-section of a single bump 94 in the textured portion 92 of the disk 90.

The invention has been described with particularity as to one embodiment. Those skilled in the art will know that variations are possible that do not depart from the spirit and scope of the inventor. Accordingly, the invention is limited only by the following claims.

What is claimed is:

1. An apparatus for texturing a glass or glass-containing substrate comprising:
   a laser source which generates a first beam;
   first and second acousto-optic modulators arranged in series in a path of the first beam;
   means for capturing a first order diffracted beam from each acousto-optic modulator to obtain first and second sets of laser pulses;
   means for directing first set of laser pulses onto a first planar surface of the substrate to form texture features; and
   means for directing second set of laser pulses onto a second planar surface of the substrate to form texture features.

2. An apparatus in accordance with claim 1, wherein the substrate to be textured is a computer disk substrate.

3. An apparatus in accordance with claim 1, wherein the texturing of the first and second planar surfaces substrate occur simultaneously.

4. An apparatus in accordance with claim 1, wherein the laser source is a temperature controlled carbon dioxide laser designed to operate at a preferred wavelength for maximum absorption by glass.

5. An apparatus in accordance with claim 1, further comprising first and second beam expander means for conditioning first and second sets of laser pulses respectively.

6. An apparatus in accordance with claim 1, further comprising means for combining an indicator beam with the first set of laser pulses.

7. An apparatus in accordance with claim 6, wherein the means for combining is a dielectrically coated dichroic mirror.

8. An apparatus in accordance with claim 1, further comprising an optical spectrum analyzer for monitoring the wavelength of the first beam.

9. An apparatus in accordance with claim 1, further comprising a two axis Galvo mirror scanner for positioning the first set pulses.

10. A method for texturing a glass or glass-containing substrate comprising:
    directing a laser beam through a first acousto-optic modulator to obtain a first set of diffracted pulses;
    directing the first set of diffracted pulses onto a first planar surface of the substrate;
    directing an undiffracted laser beam output from the first acousto-optic modulator through a second acousto-optic modulator to obtain a second set of diffracted pulses;
    directing the second set of diffracted pulses onto a second planar surface of the substrate; and
    scanning the first set of diffracted pulses in circular or spiral path on the first planar surface to cause texturing; and
    simultaneously with scanning the first set of diffracted pulses, scanning the second set of diffracted pulses in circular or spiral path on the second planar surface to cause texturing.

11. The method in accordance with claim 10, further comprising the step of alternately driving first and second acousto-optic modulators to generate the second set of diffracted pulses when the first acousto-optic modulator is not being driven.

12. A method in accordance with claim 10, wherein the step of alternately driving first and second acousto-optic modulators further comprises generating first and second slave pulses from rising and falling edges of master pulses.

13. The method of claim 10 wherein the step of directing the first set of diffracted pulses is directing first order diffracted pulses.

14. The method of claim 10 further comprising the step of monitoring the wavelength of the laser beam.

15. The method of claim 10 further comprising the step of providing an indicator beam for first set of diffracted pulses.

16. The method of claim 10, wherein the laser beam is generated by a temperature controlled carbon dioxide laser operating at a wavelength absorbed by glass.

17. The method of claim 10, wherein the step of scanning the first set of diffracted pulses uses a two-axis Galvo mirror.

* * * * *